June 23, 1964   W. W. FLIETH   3,137,967
KNOCKDOWN TOY HOUSE
Filed April 7, 1960   2 Sheets-Sheet 1

SCARF JOINT

Walter W. Flieth
INVENTOR.

BY Clarence A. O'Brien
and Harvey B. Jacobson
Attorneys

June 23, 1964  W. W. FLIETH  3,137,967
KNOCKDOWN TOY HOUSE
Filed April 7, 1960  2 Sheets-Sheet 2
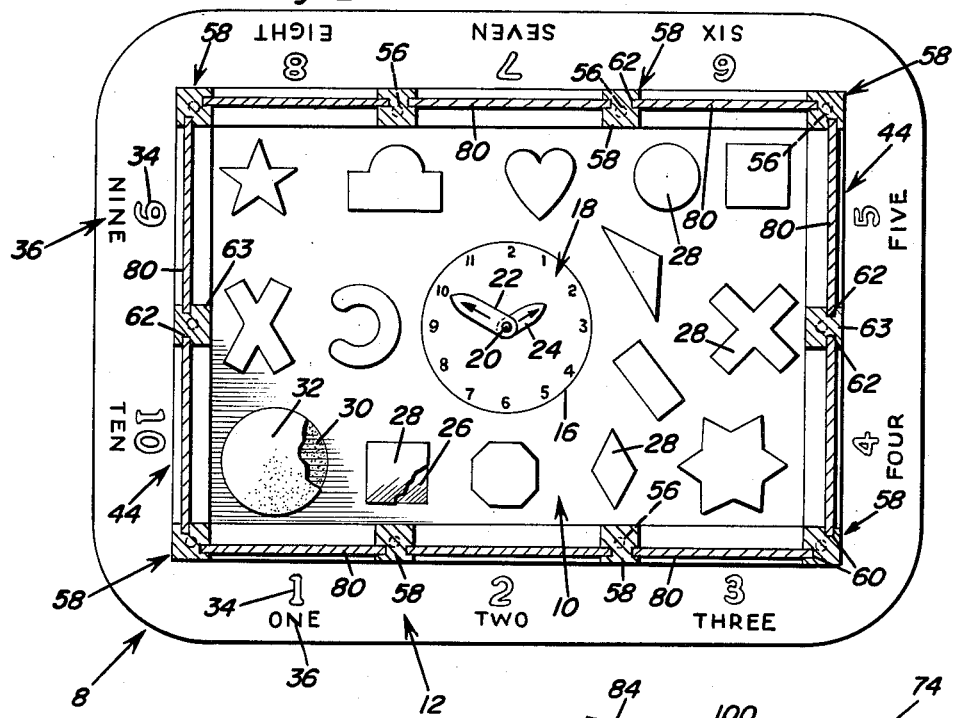
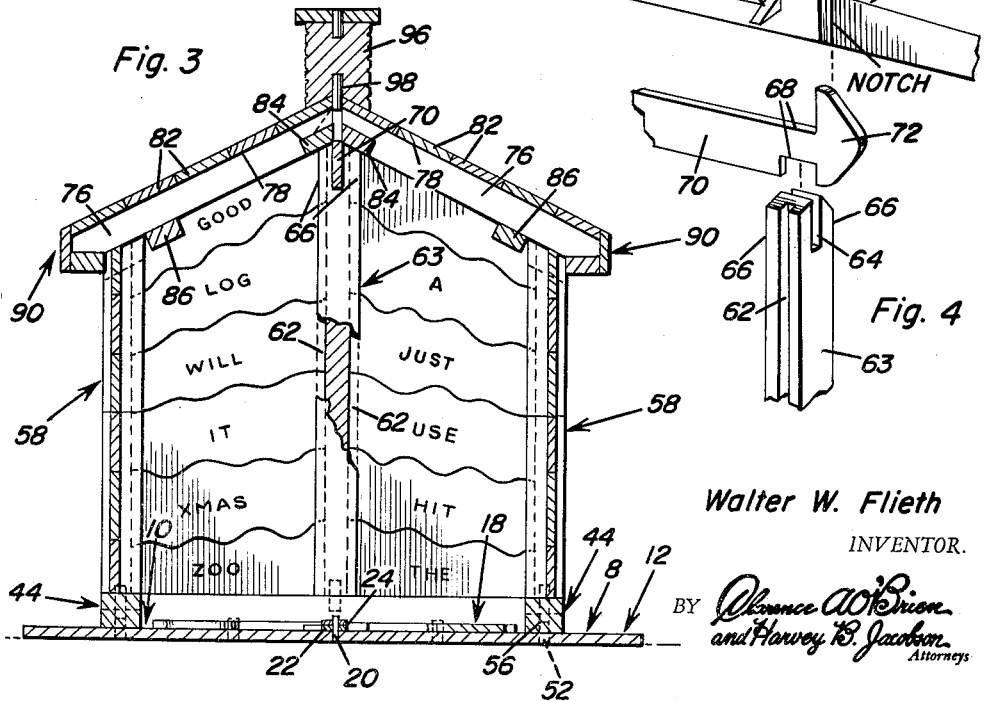
Walter W. Flieth
INVENTOR.
BY Clarence A. O'Brien
and Harvey B. Jacobson
Attorneys

United States Patent Office 3,137,967
Patented June 23, 1964

3,137,967
KNOCKDOWN TOY HOUSE
Walter W. Flieth, 11622 Stewart Ave., Chicago, Ill.
Filed Apr. 7, 1960, Ser. No. 20,621
1 Claim. (Cl. 46—19)

The present invention relates to a novel knockdown toy house constructed from colorful blocks, post-like uprights, frames, and component parts expressly designed so that they may be assembled and fitted together in interlocking relationship in an ever-interesting, fun-provoking and educational manner.

A prominent aspect of the over-all concept involves the adoption and use of the above-mentioned blocks and interrelated companion parts through the medium of which the ready-to-erect multicolored house may be built. More specifically, unique pieces or parts are distinguishably painted or otherwise color-coated to reveal some twenty-six (26), more or less, colors to the young "builder," whereby to acquaint him with basic or major colors and many and varying shades and hues thereof.

In carrying out a preferred embodiment of the invention, most of the blocks and building pieces are not only colorfully and distinguishably painted to provide recognizable clues in putting the pieces together but are additionally distinguishable in that alphabetical letters, numerals, words and sentences are revealed in a fascinating and visual manner thus providing an educational aid through the medium and stimulus of which easy-to-recall information and intelligence is imparted to children much to the delight of all persons mutually concerned.

Another object of the invention is to provide a multicolored educational-type miniature color-clad house wherein a simple wooden or an equivalent panel serves as a base, said panel having the additional practical function of providing a centralized game area or playing field which may be utilized preparatory to erecting the framework thereon, said playing field having a graduated dial serving as a clock such as may be utilized to teach a youthful observer how to tell time.

The playing area is also an innovation in that it has delineated pip-like spots laid out thereon each of a distinctive geometrical form of pattern and each of which serves as a spotting place for correspondingly shaped and colored playing pieces whereby to familiarize the youthful builder with standardized shapes and configurations and the names thereof.

Further, novelty is predicated on a flat-faced base-forming panel which is marked in such a way that readily applicable and removable strip members may be temporarily attached thereto. These connectible cooperating strip members are held in place atop the base panel by way of dowel pins fitting into sockets and they constitute sills or, as they are otherwise known in the trade, stud-supporting draft headers.

A further improvement resides in the use of the strip-type sills which are also colorfully painted or decorated for application to and retention in predetermined laid out spaces on the base panel, and wherein the adjacent corner-forming ends are overlapped to provide scarf joints, the overlapping portions having alignable keeper holes for removable reception of associated dowels on the lower ends of uprights, posts, or pillars and which will be conveniently referred to, for sake of distinction, as assembling and keeper pins.

A further improvement resides in a novel easy-to-erect and dismantle gable roof in a toy house wherein said roof is made up of prefabricated openwork frames including connected rafters with the rafters rabbeted to provide receiving and keying grooves for readily insertable and removable roof "shingles," said shingles comprising distinguishably multicolored alphabet blocks, said blocks cooperating with vertical wall alphabet blocks of other distinguishable color and which wall blocks are likewise removably keyed in place, all of the blocks, when put together, giving the finished house the unique appearance of a colorfully gaudy alphabet house; yes, an attractive puzzle-problem solved.

Other features and advantages will become more readily apparent from the following description and the accompanying drawings.

In the drawings:

FIG. 2 is a section on the horizontal line 2—2 of FIG. 1 looking in the direction of the arrows;

FIG. 3 is a section on the vertical line 3—3 of FIG. 1;

FIG. 4 is a view in perspective in which the associated or component parts of the roof are exploded to show their relationship and the featured construction of each;

FIG. 6 is a fragmentary perspective view also exploded and which functions to bring out a number of features which will be hereinafter explicitly referred to.

As already revealed the finished product comprises the aforementioned knockdown multicolored alphabet house. Some observers, after having seen the house set up, have remarked that it has the unique appearance of a houselike alphabet block. Others appear to think of the completed puzzle as a colorfully lettered information house having the intriguing characteristics and appeal of a put-together jigsaw puzzle which indeed is an aptly acceptable over-all description.

Figure 6:
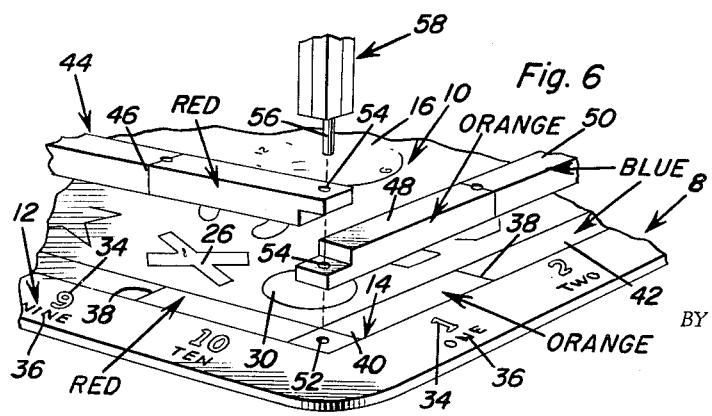

Taking up the parts in logical order the attention comes first to the foundation of the house which, as already touched upon, is a wooden or an equivalent panel 8 (FIG. 6). The bottom of this panel is flat and the top is also flat but is uniquely painted, diagrammed and unusually marked. The main rectangular central zone (or area) is denoted at 10, the marginal border area at 12, and the intervening band-like area 14. Actually this area 14 is a distinguishable rectangle which divides the border 12 from the main area 10. The latter area may perhaps be further construed as defining a game-playing field. To this end, and as seen in FIG. 2, a ring 16 is painted or otherwise provided at the center and has marginal numbers or numerals defining a simple clock dial 18 with a hub pin 20 at the center provided with long and short hands 22 and 24 thus providing a time telling clock for the youngster or other user. Within the marginal limits of the field or area 10 various pip-like checker-receiving or block-covering spots are provided. The numeral 26 designates one of the fifteen (more or less) spots which is of a predetermined color, say, red. One of the one hundred twenty-five (125) playing pieces is adapted to be associated or registered with this particular spot 26. For example, the cube 28, which is a separate movable piece, conforms to and fits on the spot 26 not only as to shape and size but as to color. In other words, if the spot 26 is red the cube 28 is red. If the next adjacent circular or disk-like spot 30 is blue, the chip or disk 32, which is applicable thereto, is also correspondingly blue; and so it goes with the rest of the spots and applicable playing pieces used in conjunction therewith. One may assume that these playing pieces and spots are representative of the commonly known geometrical designs and patterns. By repeatedly playing the "cover the spots game" the user gradually learns the names of star, circle, diamond, heart-shape and so on. That is, by resorting to repetitional use of these intelligence-imparting data good basic information is acquired. Along the same line, the border 12 is of a distinctive color. In the sample currently used, it is green. This border makes available additional aid-giving information; for example, the printed numerals denoted at 34 and the printed word indicative of the number or numeral, as at 36. In other words, the selected indicia here is the numeral "1" and the companion word "one."

With respect to the framework locating and area dividing band 14 between the two zones 10 and 12, this "band" is laid out or printed around the (1) longitudinal and (2) transverse portions of the board or panel and each straight-away component thereof is, in turn, provided with transverse lines 38 each of which is used as a zoning or marker line so that the distinguishable segments or zones 40, 42 and so on, may be readily recognized as foundation-laying places by the "builder." The segment 40 may be colored orange, the next 42 blue, the next one brown, the next one red and so on (not drawn or specially lined here to bring out charted colors in order to avoid confusion). The purpose in using this distinctively colored band is to adapt the same for reception of the correspondingly colored attachable and detachable strip members here referred to as sills 44 (often referred to in the trade as draft headers). Here again these sill strips are provided with marker lines 46 defining distinctive areas 48 and 50 (see FIG. 6). Therefore, by putting the strips in position in line with their intended positions the color orange will line up with the orange segment 40, the blue area 50 will line up with the blue segment 42, and so on. Regardless of the color aspect it is to be noted that the numeral 52 designates a socket in one (or each) corner portion of the board or panel which is adapted to line up with registrable dowel pin holes 54 carried by the extended end portions of adjacent sills. These overlapped apertured end portions provide a scarf joint which is adapted to be pinned by way of a depending dowel pin 56 on the lower end of a coacting one of the uprights 58. These uprights are posts and sometimes alternatively referred to as "corner" pillars and side and end wall pillars. There are four corner pillars and four side wall pillars, and two end wall pillars or uprights. All of these pillars have corresponding construction except that they are distinguished by carrying out the prescribed variegated color scheme.

Purely from a structural standpoint, novelty resides in the provision of a base panel with a central area marked by way of a colorful band 14 and dividing the distinguishable gameboard areas 10 and 12 from the intervening band area, the band portions receiving the cooperating dowel-pin-equipped and held strips or sills 44 with the scarf joints overlapped and providing keeper holes 54 registering with each other and the socket 52 to receive the interlocking post assembling and retaining keeper pin 56. The upper ends of the posts or uprights 58 are suitably beveled. In addition, each post or upright is provided with vertical assembling and keying grooves or channels which are conveniently referred to by the numeral 60. The central end posts or uprights 63 are also provided with grooves 62. These end posts 63 may also be differentiated (as seen in FIG. 4) inasmuch as the upper end of each post is not only beveled but is bifurcated as at 64 to define furcations 66 for retentive reception of the neck portion 68 at a cooperating end of the readily applicable and removable gable roof ridge pole or member 70. This member terminates at its ends in arrow-like heads 72. These headed and neck-equipped ends are removably attached to the bifurcated upper ends of the end uprights 63 as is clearly evident from the drawings.

Taking up now the walls, it will be seen that these walls are made up of selectively usable distinguishably colored insertable and removable alphabet "blocks." Instead of using cubical or similar oblong and other blocks here, each block is comparatively thin and the surfaces are painted a given suitably assigned color. The various colors will differentiate and also each block will be provided with a portion of a capital letter of the alphabet as for example "A." One can see from the assembled view in FIG. 1 how the blocks are put together to provide the complete letters. In other words, each block may have a part of a letter and in order to complete the letter it is necessary to assemble it with another companion or complemental block of the same color. All of these blocks are of a jigsaw puzzle-piece type. A child will soon learn to match the colors and fit the companion pieces together as he does with the ordinary flat-table-type jigsaw puzzle. By selecting the combining colors to match the basic colors already established by way of the base with the rails or sills thereon and the harmonizing uprights and posts, the puzzle pieces are dropped into place, thus providing the desired vertical side and end walls.

Figure 1:
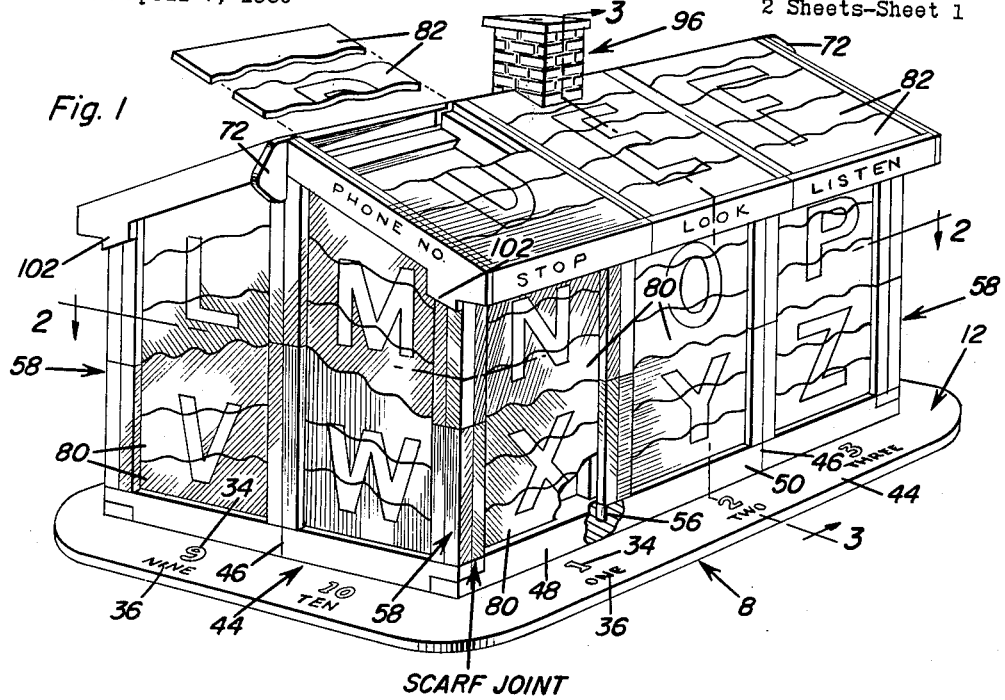
FIG. 1 is a view in perspective of a composite multicolor alphabet house constructed in accordance with the invention and showing how certain jigsaw-type blocks have been "exploded" to enlighten the reader with the seemingly original jigsaw puzzle aspect of the concept.
Figure 5:
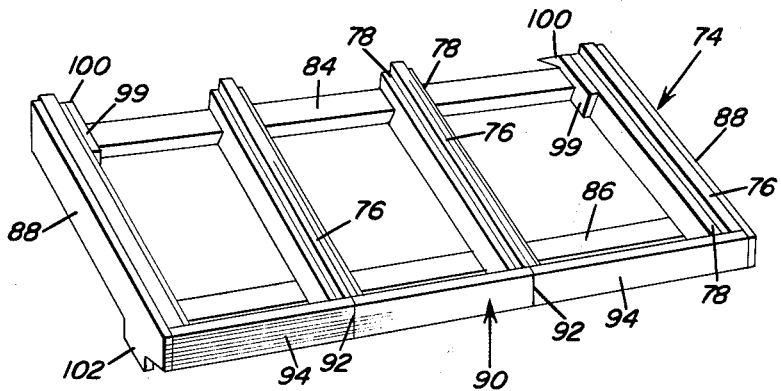
FIG. 5 is a view in perspective of one of the gable roof openwork frames.

The gable-type roof is characterized by the aforementioned ridge member or board 70 and the two outwardly and downwardly slanting roof frames or sections, one of which is shown in FIG. 5 and designated by the numeral 74. This frame is characterized by transverse longitudinally spaced interconnected rafters 76 which have their longitudinal edges rabbetted or grooved to provide assembling and keying grooves 78 for the insertable and removable roof "shingles." The puzzle pieces which go to make up the vertical walls are conveniently denoted by the numeral 80 and the ones which fit into the roof are denoted at 82 and these constitute the stated shingles. Here again they are of distinguishable colors and have letter portions thereon which fitted together provide the finished letters and also the finished roof. In other words, these shingles (alphabet blocks) are also fitted into the keying grooves 78. The rafters are connected together by longitudinal rails 84 and 86 and the veneering or trimming strips are denoted at 88 and 90, the strip 90 being divided with lines 92 to define separate areas 94 which are individually painted and which in practice are provided with words which as shown in FIG. 1 at the right go to make up a phrase "Stop look listen." In actual practice, the insertable and removable wall components whether they be those at 80 or 82 are preferably provided on the interior sides with printed words to add to the over-all educational benefit of the puzzling gamehouse.

Finally, there is the dummy chimney 96 which is of any suitable construction and is applied and held by an assembling pin or dowel 98 as seen in FIG. 3. If desired, cleats 99 with assembling hooks 100 may be provided (FIGS. 4 and 5) to assist in keeping the adjacent or abutting portions of the two frames with the ridge board 70 sandwiched therebetween. Endwise displacement of the frames is prevented by way of the limiting stops, one of which is seen at 102 in FIG. 5.

Reviewing the disclosure it may be pointed out briefly that the platform or base 8 measures in practice 12" x 16". The outer edge thereof has both the figures and words for the numerals, one through ten. The center of the platform has a clock dial with movable hands, for time telling. Around the clock are fifteen brightly colored geometric patterns such as a square, triangle, circle, heart, star, etc. there are fifteen objects or playing pieces (men) of corresponding shape and color to be fitted over these painted patterns.

Four rail-like sill members are fitted with dowel pins to lock them in place. These form the "foundation." The portion of the platform covered by the rails is painted to correspond with the color scheme used on the sill rails.

There are ten pillars (posts, uprights or "studs") colored to correspond with their position on the foundation. These are fitted in place by lower end dowel pins attached as shown.

The vertical framework "studs" are grooved to receive the jigsawed-pieces. These pieces bear letters of the alphabet and are so colored as to correspond with the studs.

The reverse side of each jigsawed-piece has a word printed on it. When the house is disassembled, these words may be arranged to form innumerable sentences. By memorizing the proper location of each word, the house may be more rapidly assembled and the child's memory is trained.

In all, the toy-alphabet-house consists of twenty-six different colors and one hundred twenty-five building pieces.

It is thought that it is not necessary to include here the step-by-step directions required, let us say, in taking the prefabricated components out of the packaging box and then setting out to erect a house. Inasmuch as interlocking puzzle pieces of all shapes and types are known, and the general procedures for putting them together and taking them apart is basically well known, a more extended explanation is regarded as not necessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

A toy knockdown portable house comprising an enlarged flat rectangular base panel provided inward of each corner with a socket, foundation sill-like rails mounted atop the base and having overlapped ends with aligned keeper holes, the keeper holes being aligned with said sockets so as to orientate the rails inwardly of the outer periphery of the base, and a framework for the house comprising corner uprights, said uprights having reduced ends comprising depending dowels providing keepers extending through the holes and into the sockets, and outwardly and downwardly inclined openwork gable roof constructing sections, said roof sections being removably mounted atop the uprights, and an intervening ridge board fitting between the roof sections and supported at its ends by vertical uprights rising from central portions of the sill members, said vertical uprights and said ridge board having intersecting recessed portions so as to lock the vertical uprights and ridge board together.

References Cited in the file of this patent

UNITED STATES PATENTS

| | | |
|---|---|---|
| 294,589 | Crandall | Mar. 4, 1884 |
| 311,793 | Stranders | Feb. 3, 1885 |
| 1,276,344 | Gilman | Aug. 20, 1918 |
| 1,329,850 | Pye | Feb. 3, 1920 |
| 1,356,929 | Lewers | Oct. 26, 1920 |
| 1,428,456 | Stranders | Sept. 5, 1922 |
| 1,492,560 | Fisher | May 6, 1924 |
| 1,569,066 | Beiger | Jan. 12, 1926 |
| 1,608,273 | Glasgow | Nov. 23, 1926 |
| 1,706,696 | Kohler | Mar. 26, 1929 |
| 2,187,087 | Leary | Jan. 16, 1940 |
| 2,659,163 | Albee | Nov. 17, 1953 |
| 2,853,804 | Bengeyfield | Sept. 30, 1958 |
| 2,904,927 | Katz | Sept. 22, 1959 |
| 2,931,129 | Boniface | Apr. 5, 1960 |
| 2,951,311 | Luther | Sept. 6, 1960 |

FOREIGN PATENTS

| | | |
|---|---|---|
| 17,281 | Great Britain | 1915 |
| 580,471 | Great Britain | Sept. 9, 1946 |